United States Patent [19]
Tashiro et al.

[11] 3,991,358
[45] Nov. 9, 1976

[54] CONSTANT VOLTAGE DEVICE FOR A MAGNETO ALTERNATING CURRENT GENERATOR

[75] Inventors: Minoru Tashiro, Yokohama; Shigeru Kimura, Tokyo; Kazufumi Obara, Machida, all of Japan

[73] Assignee: Stanley Electric Co., Ltd., Tokyo, Japan

[22] Filed: Sept. 23, 1974

[21] Appl. No.: 508,324

[30] Foreign Application Priority Data
Nov. 28, 1973 Japan.................... 48-136076[U]

[52] U.S. Cl................................. 322/28; 320/71; 322/91
[51] Int. Cl.²........................ H02J 7/14; G02P 9/26
[58] Field of Search ................ 320/39, 40, 61, 71, 320/9, 57-60; 322/32, 73, 91, 28

[56] References Cited
UNITED STATES PATENTS

| | | | |
|---|---|---|---|
| 3,454,860 | 7/1969 | Burkett et al.................... | 320/40 X |
| 3,723,844 | 3/1973 | Cavil................................ | 320/59 |
| 3,745,442 | 7/1973 | Gynn................................ | 322/91 X |
| 3,848,177 | 11/1974 | Gynn................................ | 320/61 X |

*Primary Examiner*—Robert J. Hickey
*Attorney, Agent, or Firm*—Flynn & Frishauf

[57] ABSTRACT

A constant voltage device for a magneto alternating current generator comprises a silicon controlled rectifier and a trigger signal generator circuit which comprises a voltage divider, a constant voltage element connected between the voltage divider and a gate of the silicon controlled rectifier and further a capacitor for forming a series-parallel delay circuit together with the voltage divider and for phase controlling the silicon controlled rectifier.

9 Claims, 8 Drawing Figures

CONSTANT VOLTAGE DEVICE FOR A MAGNETO ALTERNATING CURRENT GENERATOR

The present invention relates to a constant voltage device for a magneto alternating current generator adapted to regulate an alternating current output from a magneto alternating current generator at a fixed value.

A magneto alternating current generator will produce an alternating current output when driven by a small sized motor being carried on small sized vehicles, two-wheeled vehicles, snow mobiles, motor boats or the like. However, since the output voltage increases with a rise in revolutions per minute of the motor, a problem exists in that when a battery is charged by the rectified alternating current output, a large current is applied to the battery and thereby the battery suffers damage and its useful life is shortened. To avoid the above disadvantages, a constant voltage device is usually provided in an output circuit of the magneto alternating current generator so as to regulate the alternating current output at a fixed value.

Such a constant voltage device used in the prior art, in general, includes a silicon controlled rectifier adapted to be connected to an alternating current output circuit of a magneto alternating current generator. The silicon controlled rectifier, when it is triggered by a trigger signal, is caused to conduct and operates to diverge or to short circuit the alternating current output circuit of the magneto alternating current generator, thereby regulating the alternating current output at a fixed value. The prior art devices use various kinds of triggering methods which results in remarkably different regulating characteristics of the overall device.

In one prior art device, a trigger signal generator circuit which includes a voltage divider and a constant voltage element connected between the voltage divider and a gate of a silicon controlled rectifier is connected to an alternating current output circuit of the alternating current generator and the silicon controlled rectifier is triggered when the alternating current output exceeds a fixed value. However, the constant voltage device according to this prior art construction has various defects if a charging capability of a battery is deteriorated by a lower temperature or if a heavy load is connected in parallel to the battery. Major defects of the above conventional device are: (1) a hunting phenomenon which occurs when the alternating current output reaches a certain specified value, (2) a flicker phenomenon which occurs in the case when a load such as a lamp is used, and (3) there is an extreme drop of voltage applied to a load occurring from disconnection of the battery or the like.

SUMMARY OF THE INVENTION

Accordingly, it is an object of the present invention to provide a constant voltage device for a magneto alternating current generator which obviates the disadvantages of the prior art.

It is another object of the present invention to provide a constant voltage device for a magneto alternating current generator in which a trigger signal generator circuit includes a capacitor for forming a series-parallel delay circuit together with a voltage divider and for phase controlling a silicon controlled rectifier.

DETAILED DESCRIPTION OF ILLUSTRATED EMBODIMENT

Figure 1:
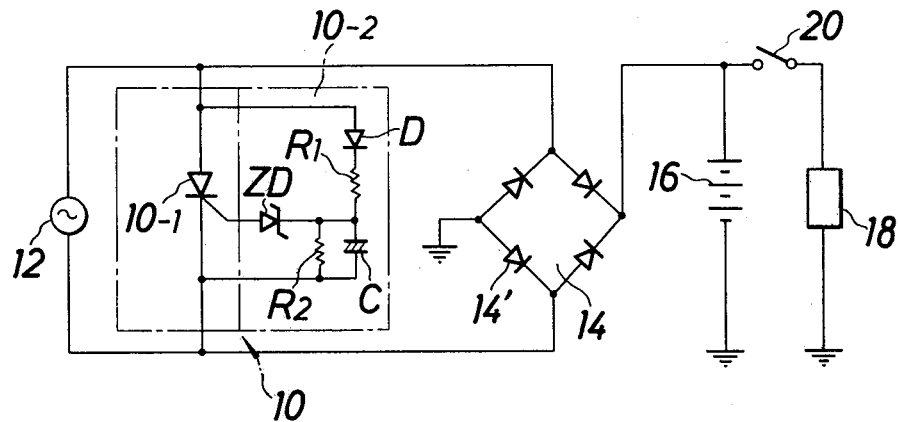
FIG. 1 is a circuit diagram showing an embodiment of a constant voltage device for a magneto alternating current generator according to the present invention.

Referring now to the drawings, particularly FIG. 1 which shows an embodiment using a constant voltage device 10 according to the present invention, a magneto alternating current generator 12 is coupled to a full wave rectifier circuit 14 which in turn is coupled to a battery 16. A load, for example a lamp 18 and a load throwing switch 20 are connected across the battery 16. The constant voltage device 10 comprises a silicon controlled rectifier 10-1 connected to an alternating current output circuit of the alternating current generator 12 so as to short circuit the latter and a trigger signal generator circuit 10-2 adapted to produce a trigger signal which controls the conduction of the silicon controlled rectifier 10-1. The trigger signal generator circuit 10-2 comprises a diode D connected between an anode and a cathode of the silicon controlled rectifier 10-1 so as to prevent a reverse current, a series circuit having two resistors R1 and R2, as a voltage divider, a constant voltage element ZD, for example, a Zener diode connected between a connecting point of the voltage dividing resistors R1 and R2 and the gate of the silicon controlled rectifier 10-1, and a capacitor C connected in parallel to the resistor R2. The capacitor C is adapted to form a series-parallel circuit together with the resistors R1 and R2 of the voltage divider.

The operation of the device shown in FIG. 1 is as follows: when the alternating current generator 12 is driven by a motor (not shown) the alternating current output thereof increases. When an output voltage of the rectifier circuit 14 exceeds the charging voltage of the battery 16, the battery 16 begins to be charged and the charging voltage of the battery 16 rises. When the alternating current generator 12 is further driven at a higher number of revolutions per minute (RPM's), the charging voltage of the battery 16 further rises. If a circuit constant of the trigger signal generator circuit 10-2 is determined in a manner that when the output voltage exceeds a certain fixed value a trigger signal is produced and that the signal triggers the silicon controlled rectifier 10-1, by the output voltage of the alternating current generator 12 which exceeds a fixed value, the silicon controlled rectifier is triggered to conduct. The conduction of the silicon controlled rectifier 10-1 effectively short circuits the output of the alternating current generator 12 and thereby the output voltage will be reduced to a fixed voltage value. Accordingly, an output voltage greater than the fixed value will not be applied to the rectifier 14 notwithstanding the alternating current generator being driven at a higher rotation rate and the battery 16 will not be charged at a voltage more than the fixed value.

Figure 2:
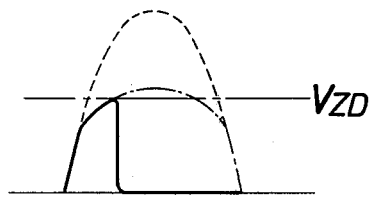
FIG. 2 illustrates an output wave form showing a control according to the conventional device.
Figure 3:
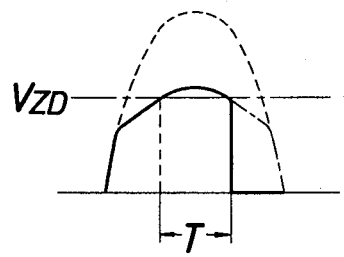
FIGS. 3 and 4 illustrate output wave forms showing a control of a device according to the present invention.

The following is a detailed description of the manner of triggering the silicon controlled rectifier 10-1 with a trigger signal produced from the trigger signal generator circuit 10-2. The capacitor C constituting the series-parallel delay circuit together with the voltage dividing resistors R1 and R2 repeats a charging and discharging operation according to each of the cycles of the alternating current output from the alternating current generator 12. When the charging voltage of the capacitor C becomes higher than the voltage determined by the constant voltage element ZD, the trigger signal is applied to the gate to trigger the silicon controlled rectifier 10-1. The generating of the trigger signal is determined by a time constant of the series-parallel delay circuit comprising the resistor R1 and capacitor C. In the conventional constant voltage device only using the voltage divider without having the capacitor, when the wave form of the voltage reached a Zener voltage, for example, Vzd of the constant voltage element ZD, the trigger signal was immediately produced to cause the silicon controlled rectifier 10-1 to conduct, thereby cutting off the alternating current output as shown by the solid line in FIG. 2. On the contrary, since the device of the present invention uses the capacitor C, the trigger point is delayed for a time T longer than that of the conventional device, as shown in FIG. 3.

Figure 4:
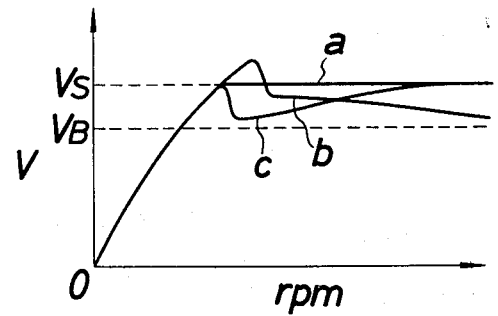

Therefore, in the device according to the present invention the output characteristics of the control starting point becomes smooth because the starting point of the control is near the falling point of the positive cycle. On the contrary, in the conventional device since the control starting point is determined at the left side relative to the peak of the positive cycle, more than a half of the positive cycle is cut simultaneously with the control starting point and a great current will be caused to flow in the silicon controlled rectifier. Because these large currents delay the rising of the negative cycle of the alternating current generator, the output voltage becomes more and more reduced. Such a condition is shown in FIG. 4. In FIG. 4, the nominal battery voltage indicated by VB, the characteristics of the device according to the present invention by *a* and the characteristics of the conventional devices by *b* and *c*.

Figure 5:
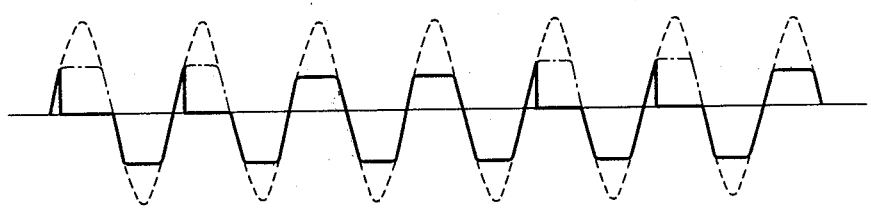
FIG. 5 illustrates an output wave form similar to FIG. 2.
Figure 6:
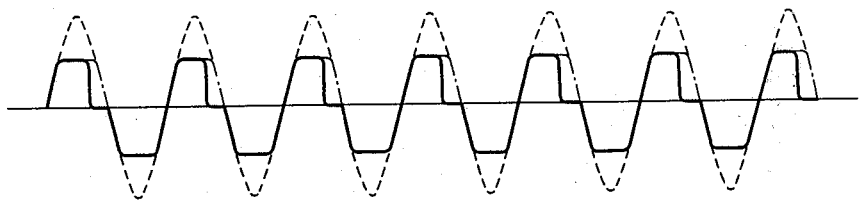
FIG. 6 illustrates a wave form showing output voltage as a function of number of revolutions when a control was effected by the conventional device and the device according to the present invention.

Further, in the conventional devices, a hunting phenomenon occurs, as shown in FIG. 5, near the control starting point due to the lower temperatures and heavy loads, and a flicker phenomenon will occur in the load such as lamp 18. On the contrary, with the device according to the present invention, the control is normally performed as shown in FIG. 6 always without regard to external conditions and the rate of revolution of the generator 12.

In FIGS. 2, 3, 5 and 6, the dashed line indicates the alternating current output wave form when the battery 16 is disconnected, the dot and dash chain line indicates the output wave form when the battery 16 is connected but is not being controlled, and the solid line indicates the output wave form when the battery 16 is connected and is being controlled.

Figure 7:
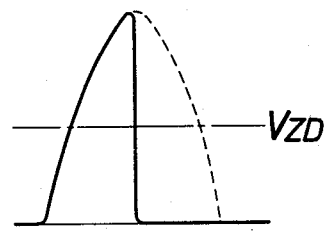
FIG. 7 illustrates a wave form showing a controlling condition according to the present invention when a battery is disconnected from the device.

FIG. 7 illustrates a controlled wave form in a case wherein the battery was disconnected from the circuit while allowing the load 18 to operate. The output under these conditions is somewhat reduced relative to the predetermined voltage. On the contrary, in the conventional device, when the battery 16 is disconnected, the controlled output wave form rises quickly and becomes sharp and the trigger point becomes very rapid. As a consequence, the rising of the negative cycle of the alternating current generator is delayed and the controlled output voltage is remarkably reduced to less than half of the predetermined desired value.

Figure 8:
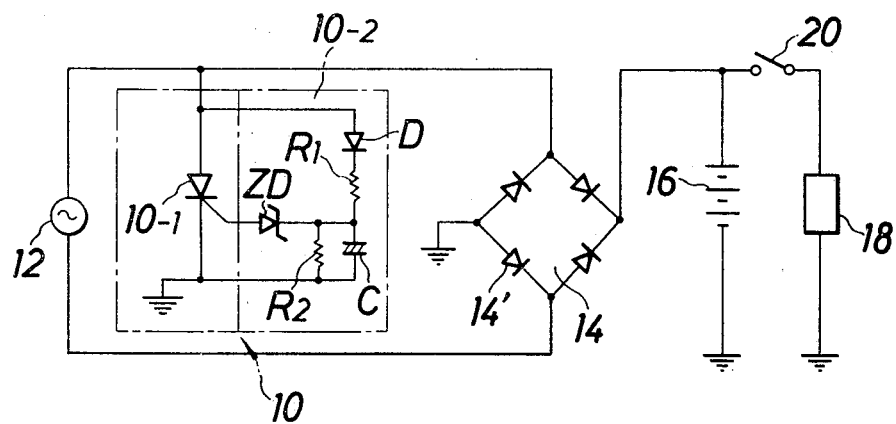
FIG. 8 is a circuit diagram of a modification of the embodiment of FIG. 1.

As shown in FIG. 8, in a modified constant voltage device of the present invention, the silicon controlled rectifier 10-1 may have its cathode electrode grounded without being directly connected in parallel to the alternating current generator 12 and may be connected in parallel to the alternating current generator 12 through one diode element 14' of the full wave rectifier circuit 14. In the arrangement of FIG. 8, reverse current is not applied to the silicon controlled rectifier 10-1. The operation of the silicon controlled rectifier in FIG. 8 is similar to that of the above detailed description.

It is further understood by those skilled in the art that the foregoing description is a preferred embodiment of the invention and that various changes and modifications may be made thereto without departing from the spirit and scope of the inventive concept.

What is claimed is:

1. A constant voltage device for a magneto alternating current generator (12) having an alternating current output circuit which includes first and second output terminals, the constant voltage device comprising:
    a controlled rectifier (10-1) having anode, cathode and gate electrodes, one of said anode and cathode electrodes being connected to the first output terminal of the alternating current generator (12), the other of said anode and cathode electrodes being connected to a fixed voltage potential;
    a trigger signal generator circuit (10-2) connected to said first output terminal of said alternating current generator for generating a trigger signal which selectively triggers said controlled rectifier (10-1) into a conducting state, said trigger signal generator (10-2) comprising:
        a voltage divider including a pair of series connected resistance means (R1, R2) coupled to said first output terminal of said alternating current generator (12);
        a constant voltage element (ZD) connected between said gate electrode of said controlled rectifier (10-1) and the junction of said series connected resistance means (R1, R2) of said voltage divider; and
        a capacitor (C) coupled to said voltage divider (R1, R2) for forming a series-parallel delay circuit together with said voltage divider (R1, R2) and for phase controlling said controlled rectifier (10-1); and
    rectifier means (14) coupled across said first and second output terminals of said alternating current generator (12), said rectifier means including at least one diode coupling said second output terminal to a fixed voltage potential.

2. A constant voltage device according to claim 1 wherein said fixed voltage potentials are both ground potential.

3. A constant voltage device according to claim 2 wherein said rectifier means comprises a full wave rectifier circuit which includes four bridge-connected diodes, one of said diodes coupling said second output terminal of said alternating current generator (12) to ground potential.

4. A constant voltage device according to claim 3 wherein the output of said full wave rectifier circuit is coupled to a battery (16) and to a load (18).

5. A constant voltage device according to claim 1 wherein said voltage divider is coupled in parallel with said controlled rectifier, said capacitor being coupled in parallel with one of said series connected resistance means.

6. A constant voltage device according to claim 1 wherein one of said series connected resistance means (R1) is coupled to the anode electrode of said controlled rectifier; and the other of said series connected resistance means (R2) is coupled to the cathode electrode of said controlled rectifier.

7. A constant voltage device according to claim 6 wherein said capacitor is connected in parallel with said other of said series connected resistance means (R2).

8. A constant voltage device according to claim 1 wherein said voltage divider further comprises a diode (D) coupled in series with said series connected resistance means (R1, R2).

9. A constant voltage device according to claim 1 wherein said rectifier means comprises full wave rectification means (14) coupled to the output terminal of said alternating current generator (12), the output of said full wave rectification means (14) being coupled to a battery (16) and to a load (18).

* * * * *